United States Patent
Zhou et al.

(10) Patent No.: US 11,990,630 B1
(45) Date of Patent: May 21, 2024

(54) EXTERNAL CLADDING FILM, ENERGY STORAGE DEVICE AND ELECTRICAL EQUIPMENT

(71) Applicants: Shenzhen Hithium Energy Storage Technology Co., Ltd., Guangdong (CN); Xiamen Hithium Energy Storage Technology Co., Ltd., Fujian (CN)

(72) Inventors: Wenyang Zhou, Guangdong (CN); Yongfeng Xiong, Guangdong (CN); Feng Wang, Guangdong (CN)

(73) Assignees: Shenzhen Hithium Energy Storage Technology Co., Ltd., Guangdong (CN); Xiamen Hithium Energy Storage Technology Co., Ltd., Fujian (CN)

( * ) Notice: Subject to any disclaimer, the term of this patent is extended or adjusted under 35 U.S.C. 154(b) by 0 days.

(21) Appl. No.: 18/537,532

(22) Filed: Dec. 12, 2023

(30) Foreign Application Priority Data

Feb. 9, 2023 (CN) .......................... 202310091081.X

(51) Int. Cl.
*H01M 50/124* (2021.01)
*H01M 50/102* (2021.01)
(Continued)

(52) U.S. Cl.
CPC ..... *H01M 50/1245* (2021.01); *H01M 50/102* (2021.01); *H01M 50/124* (2021.01);
(Continued)

(58) Field of Classification Search
None
See application file for complete search history.

(56) References Cited

U.S. PATENT DOCUMENTS

| | | | | |
|---|---|---|---|---|
| 2013/0034764 | A1* | 2/2013 | Ochi | H01M 50/141 |
| | | | | 429/99 |
| 2015/0340663 | A1* | 11/2015 | Minagata | H01M 50/119 |
| | | | | 429/163 |
| 2017/0250388 | A1* | 8/2017 | Unno | H01M 50/141 |

FOREIGN PATENT DOCUMENTS

| | | | |
|---|---|---|---|
| CN | 206388740 U | | 8/2017 |
| CN | 209785984 U | * | 12/2019 |

(Continued)

OTHER PUBLICATIONS

WIPO, International Search Report and Written Opinion for International Patent Application No. PCT/CN2023/075279, Jul. 6, 2023, 15 pages.

(Continued)

*Primary Examiner* — Ula C Ruddock
*Assistant Examiner* — Amanda Rosenbaum
(74) *Attorney, Agent, or Firm* — IP Spring

(57) ABSTRACT

The present disclosure provides an external cladding film, an energy storage device and electrical equipment. The energy storage device includes an external cladding film and a housing. The external cladding film includes two side film sections each having a first cut groove and a second cut groove. The first cut groove and the second cut groove both penetrate through the side film section. A bottom surface of the first cut groove and a bottom surface of the second cut groove are both spaced from inner edges of the side film sections. Each side film section has a first oblique crease and a second oblique crease. A first free end of the first oblique crease intersects with a side surface of the first cut groove. A distance between the first free end and the bottom surface of the first cut groove is greater than 0.

19 Claims, 12 Drawing Sheets

(51) Int. Cl.
*H01M 50/103* (2021.01)
*H01M 50/136* (2021.01)

(52) U.S. Cl.
CPC ........ *H01M 50/103* (2021.01); *H01M 50/136* (2021.01); *H01M 2220/20* (2013.01)

(56) References Cited

FOREIGN PATENT DOCUMENTS

| | | | |
|---|---|---|---|
| CN | 209785984 U | | 12/2019 |
| CN | 113675521 A | | 11/2021 |
| CN | 215184291 U | * | 12/2021 |
| CN | 215184291 U | | 12/2021 |
| CN | 115275459 A | | 11/2022 |
| JP | 2013161632 A | | 8/2013 |
| JP | 2020017401 A | * | 1/2020 |
| JP | 2020017401 A | | 1/2020 |

OTHER PUBLICATIONS

CNIPA, Notification to Grant Patent Right for Invention for Chinese Patent Application No. 202310091081.X, Apr. 9, 2023, 3 pages.

* cited by examiner

EXTERNAL CLADDING FILM, ENERGY STORAGE DEVICE AND ELECTRICAL EQUIPMENT

CROSS-REFERENCE TO RELATED APPLICATIONS

This application claims priority under 35 U.S.C. § 119(a) to Chinese Patent Application No. 202310091081.X, filed Feb. 9, 2023, the entire disclosure of which is incorporated herein by reference.

TECHNICAL FIELD

The present disclosure relates to a technical field of energy storage devices and in particular to an external cladding film, an energy storage device and electrical equipment.

BACKGROUND

A housing of an energy storage device is generally metal and is electrically conductive, so an insulating external cladding film is necessary to cover the housing of the energy storage device. Electrical equipment may include hundreds to thousands of energy storage devices. In order to ensure a high service life of the electrical equipment, a high degree of consistency of the energy storage devices is required. In the prior art, an external cladding film is usually configured for covering the energy storage device. When covering, a part of the external cladding film exceeding a side plate of the energy storage device and a part of the external cladding film exceeding a bottom plate of the energy storage device are both coated with glued layers, which tend to stick together, thereby being prone to misalignment during attachment, and further affecting the consistency of the energy storage device.

SUMMARY

The purpose of the present disclosure is to provide an external cladding film, an energy storage device and electrical equipment for improving consistency.

The present disclosure provides an energy storage device. The energy storage device includes an external cladding film and a housing. The external cladding film includes a main body and a glued layer coated on the main body. The housing includes a bottom plate, two face plates opposite to each other, and two side plates opposite to each other. The bottom plate is fixedly connected to bottom sides of the two side plates. The two face plates are fixedly connected between the two side plates and are both fixedly connected to the bottom plate. The external cladding film includes two side film sections, a bottom film section, a first face film section and a second face film section. The two side film sections are located at opposite ends of the external cladding film and cover outside surfaces of the two side plates respectively. The bottom film section is connected between the two side film sections and covers an outside surface of the bottom plate. The first face film section and the second face film section are located at opposite ends of the bottom film section, and are both connected between the two side film sections and cover the outside surfaces of the two face plates respectively. Each side film section defines a first cut groove and a second cut groove spaced from the first cut groove. The first cut groove (203a, 203b) and the second cut groove both penetrate through the side film section along a thickness direction of the side film section and penetrate through an outer edge of the side film section. A bottom surface of the first cut groove and a bottom surface of the second cut groove are both spaced from an inner edge of the side film section. The first cut grooves of the two side film sections are located at opposite sides of the bottom film section. The second cut grooves of the two side film sections are located at opposite sides of the bottom film section and located at one sides of the first cut grooves away from the first face film section. Each side film section includes a first oblique crease and a second oblique crease. The first oblique crease is located at one side of the first cut groove away from the second cut groove. The first oblique crease includes a first fixed end and a first free end. The first fixed end is an intersection of the side film section, the first face film section and the bottom film section. The first free end intersects with a side surface of the first cut groove. A distance between the first free end and the bottom surface of the first cut groove is greater than 0. The second oblique crease is located at one side of the second cut groove away from the first cut groove. The second oblique crease includes a second fixed end and a second free end. The second fixed end is an intersection of the side film section, second face film section and bottom film section. The second free end intersects with a side surface of the second cut groove. A distance between the second free end and the bottom surface of the second cut groove is greater than 0.

The present disclosure provides an energy storage device in which the side film section of the external cladding film can be folded along the first oblique crease and the second oblique crease, to cover and adhere to the side plate of the energy storage device. Generally, when actual creases of the first oblique crease and the second oblique crease are made, a pre-defined standard crease is usually predefined. In practice, the first free end of the first oblique crease and the second free end of the second oblique crease are usually offset from the standard crease, and the degree of offset from the standard crease may be different, which may cause the side film section to be misaligned when covering the side plate. In the present disclosure, by defining the first cut groove in the side film section and setting a distance of the bottom surface of the first cut groove exceeding the first free end of the first oblique crease to be greater than 0, it is ensured that, when making the first oblique crease, the first free end of the first oblique crease will not exceed the bottom surface of the first cut groove, regardless of whether the first free end of the actual crease of the first oblique crease is offset towards either side of the standard crease; that is, this ensures that the first cut groove is overcut relative to the first oblique crease, thus ensuring that an area of the side film section on a side of the first cut groove away from the second cut groove fits closely to the side plate and does not crease, thus further ensuring that the side film section is not prone to misalignment when covering the side plate. At the same time, by defining the second cut groove in the side film section and setting a distance of the bottom surface of the second cut groove exceeding the second free end of the second oblique crease to be greater than 0, which ensures that, when making the second oblique crease, the second free end of the second oblique crease will not exceed the bottom surface of the second cut groove, regardless of whether the second free end of the actual crease of the second oblique crease is offset towards either side of the standard crease; that is, this ensures that the second cut groove is overcut relative to the second oblique crease, thus ensuring that an area of the side film section on a side of the second cut groove away from the first cut groove fits closely to the side plate and does not crease, thus further ensuring that the side film section is not prone to misalignment when covering the side plate.

In addition, even if the offset of the first oblique crease and the offset of the second oblique crease are different compared to the standard crease, it is possible to ensure that the side film section does not crease when covering the side plate, avoiding a problem of bulging out when covering the side plate and ensuring that the side film section is not easily misaligned when covering the side plate, thus providing a consistency of the energy storage device and thus further helping to improve a service life of electrical equipment.

In addition, the external cladding film does not require the bottom film section to be folded, so that the outside surface of the bottom plate can be fully covered by the bottom film section, which avoids a problem of crease caused by folding and covering, thus further providing the consistency of the energy storage device.

BRIEF DESCRIPTION OF THE ACCOMPANYING DRAWINGS

In order to more clearly illustrate the technical solutions in the embodiments or prior art of the present disclosure, a brief description of the accompanying drawings to be used in the embodiments or prior art will be given below. For a person of ordinary skill in the art, the accompanying drawings in the following description are only some embodiments of the present disclosure, and other accompanying drawings can be obtained on the basis of these drawings.

The description of reference signs:
1—electrical equipment; 1000—energy storage device; 100—housing assembly; 10—housing; 11—side plate; 12—top cover; 12a—pole hole; 12b—liquid injection hole; R121—edge area; R122—mounting area; 121—top cover body; 121a—first top cover outer periphery; 121b—second top cover outer periphery; 122—bump; 122a—first bump outer periphery; 122b—second bump outer periphery; 13—bottom plate; 14—face plate; 20—top patch; 20a—first top patch outer periphery; 20b—second top patch outer periphery; 21—hollow portion; 21a—first periphery; 21b—second periphery; 200—external cladding film; 201—first edge; 202—second edge; 203a, 203b—first cut groove; 204a, 204b—second cut groove; 210—side edge crease; 220a—first bottom edge crease; 220b—second bottom edge crease; 230—top edge crease; 240, 270a—first oblique crease; P1—first fixed end; Q1—first free end; 250, 270b—second oblique crease; P2—second fixed end; Q2—second free end; 260—standard crease; S1—side film section; S11—first section; S12—second section; S13—third section; S2—bottom film section; S31—first face film section; S32—second face film section; S4—top film section; 300—electric core.

DETAILED DESCRIPTION OF ILLUSTRATED EMBODIMENTS

The technical solutions in the embodiments of the present disclosure will be clearly and completely described below with reference to the accompanying drawings in the embodiments of the present disclosure. The embodiments described are only a part of the embodiments of the present disclosure, and not all of them. Based on the embodiments in the present disclosure, all other embodiments obtained by a person of ordinary skill in the art shall fall within a protection scope of the present disclosure.

Figure 1:
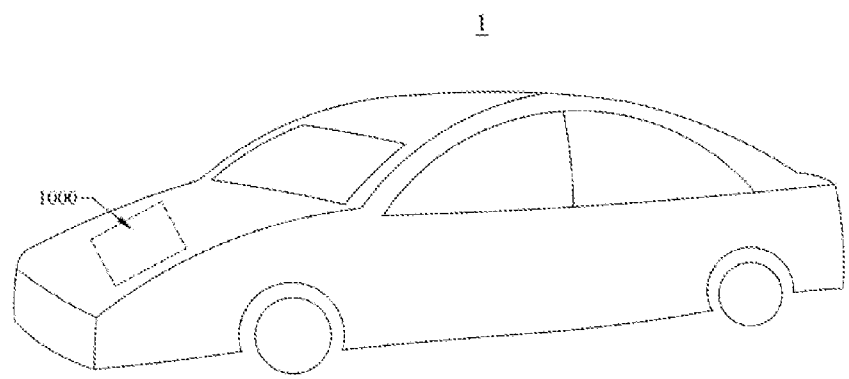
FIG. 1 illustrates a structural schematic diagram of electrical equipment in accordance with one embodiment of the present disclosure.

Referring to FIG. 1, FIG. 1 illustrates a structural schematic diagram of electrical equipment 1 in accordance with one embodiment of the present disclosure.

The electrical equipment 1 has an energy storage device 1000. The energy storage device 1000 is configured to provide power to the electrical equipment 1. For example, the electrical equipment 1 may be a vehicle, an electronic device, a drone or other devices. The electronic device may be a laptop, a tablet, a mobile phone and the like. In some embodiments of the present disclosure, a vehicle is taken as an example of the electrical equipment 1.

Figure 2:
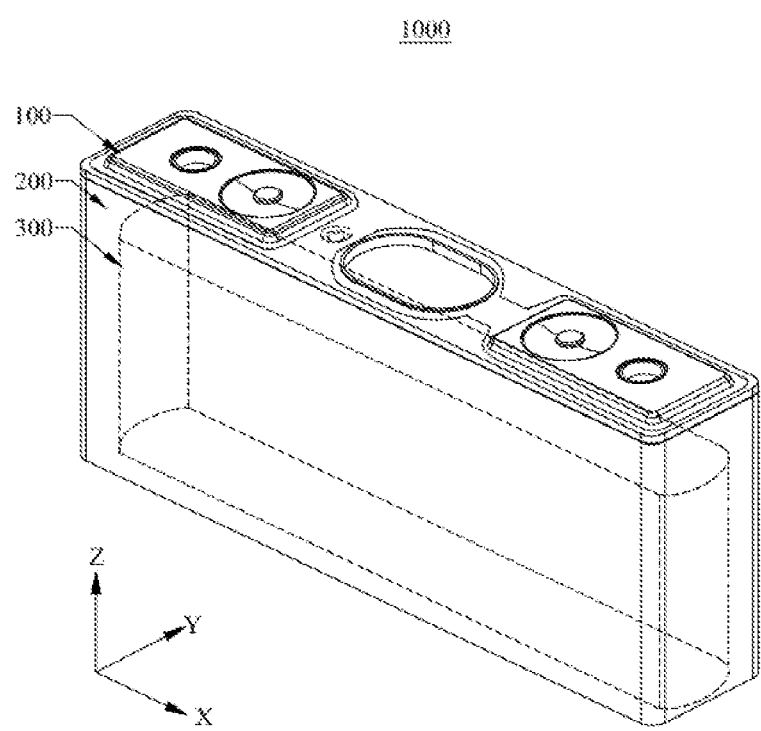
FIG. 2 illustrates a structural schematic diagram of an energy storage device in the electrical equipment shown in FIG. 1.
Figure 3:
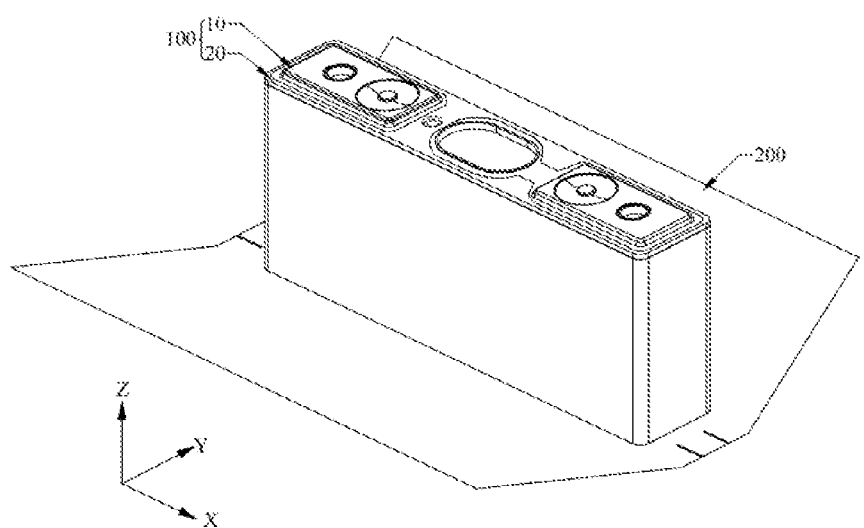
FIG. 3 illustrates a structural schematic diagram of an external cladding film covering a housing assembly in the energy storage device shown in FIG. 2.

Referring to FIGS. 2 and 3, FIG. 2 illustrates a structural schematic diagram of an energy storage device 1000 in the electrical equipment 1 shown in FIG. 1. FIG. 3 illustrates a structural schematic diagram of an external cladding film 200 covering a housing assembly 100 in the energy storage device 1000 shown in FIG. 2.

For ease of description, as shown in FIG. 2, a width direction of the energy storage device 1000 is defined as an X-axis direction, a thickness direction of the energy storage device 1000 is defined as a Y-axis direction, a height direction of the energy storage device 1000 is defined as a Z-axis direction. The directional items "top", "bottom", "left", "right" and the like used in the description of the energy storage device 1000 in the present disclosure are based on an orientation shown in FIG. 2 of the attached drawings. The "top" is oriented in a positive direction of the Z-axis, the "bottom" is oriented in a negative direction of the Z-axis, the "left" is oriented in a negative direction of the X-axis, and the "right" is oriented in a positive direction of the X-axis, which does not limit the energy storage device 1000 in a practical application scenario.

The energy storage device 1000 includes a housing assembly 100, an external cladding film 200, an electric core 300 (dashed line shown in FIG. 1), a positive pole (not shown in FIG. 1) and a negative pole (not shown in FIG. 1). The cladding film 200 is attached to the housing assembly 100. The electric core 300 is mounted inside the housing assembly 100. The electric core 300 includes a positive electrode sheet, a negative electrode sheet and a separator located between the positive electrode sheet and the negative electrode sheet. After the positive electrode sheet, the separator and the negative electrode sheet are stacked in sequence, and then wound to form the electric core 300. Both the positive pole and the negative pole are mounted on the housing assembly 100 and are electrically connected to the electric core 300. Specifically, the positive pole is electrically connected to the positive electrode sheet to achieve an electrical connection between the positive pole and the electric core 300. The negative pole is electrically connected to the negative electrode sheet to achieve an electrical connection between the negative pole and the electric core 300. The positive pole and negative pole both protrude towards a direction away from the electric core 300 relative to the housing assembly 100, to facilitate an electrical connection of the energy storage device 1000 to an external device.

Figure 4:
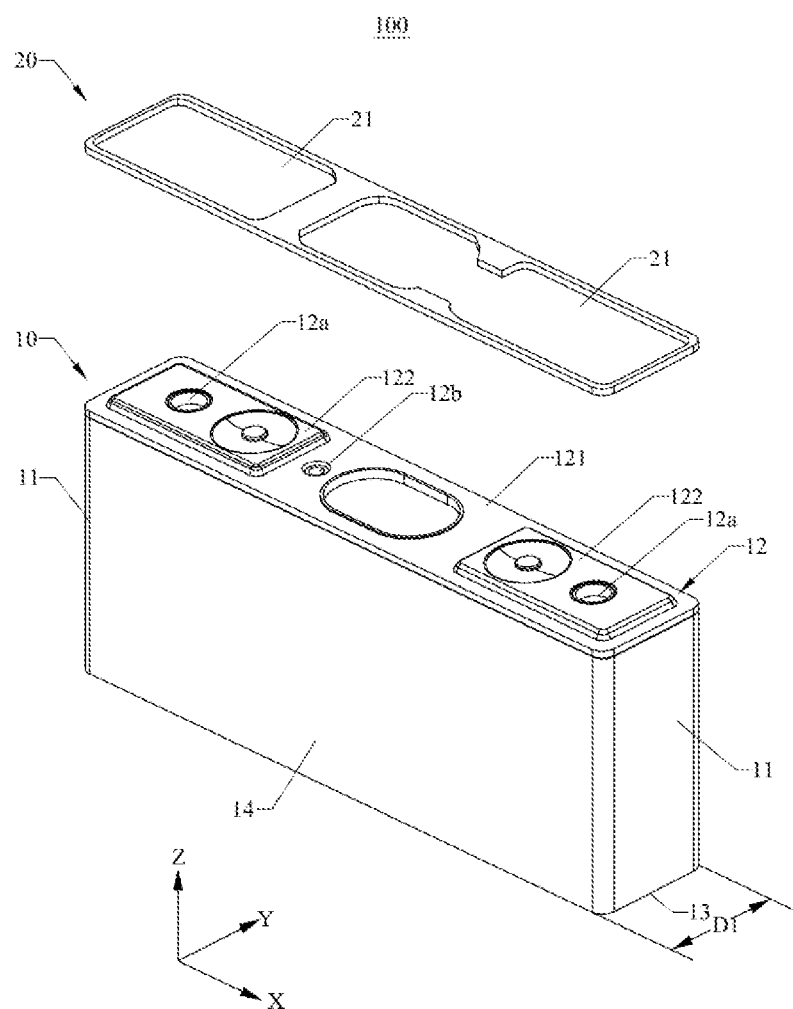
FIG. 4 illustrates an exploded structural schematic diagram of the housing assembly in the energy storage device shown in FIG. 2.
Figure 5:
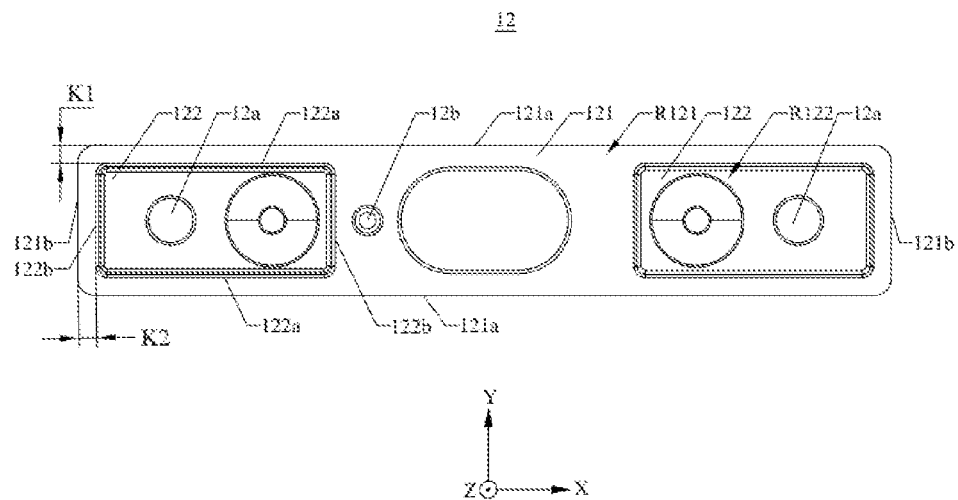
FIG. 5 shows a top view of a top cover in the housing assembly shown in FIG. 4.

Referring to FIGS. 4 and 5, FIG. 4 illustrates an exploded structural schematic diagram of the housing assembly 100 in the energy storage device 1000 shown in FIG. 2; FIG. 5 shows a top view of the top cover 12 in the housing assembly 100 shown in FIG. 4.

The housing assembly 100 includes a housing 10 and a top patch 20. The top patch 20 is mounted on a top side of the housing 10. A width direction of the housing 10 is in the X-axis direction. A thickness direction of the housing 10 is in the Y-axis direction. A height direction of the housing 10 is in the Z-axis direction.

Specifically, the housing 10 includes two side plates 11, a top cover 12, a bottom plate 13 and two face plates 14. The two side plates 11 are located opposite to each other in the X-axis direction. The top cover 12 and the bottom plate 13 are located opposite to each other in the Z-axis direction. The top cover 12 is fixedly connected to top sides of the two side plates 11. The bottom plate 13 is fixedly connected to bottom sides of the two side plates 11. The two face plates 14 are located opposite to each other in the Y-axis direction, and are fixedly connected between the two side plates 11, and are fixedly connected between the top cover 12 and the bottom plate 13. The two side plates 11, the top cover 12, the bottom plate 13 and the two face plates 14 together form an receiving space. The receiving space can receive the electric core 300. For example, the side plates 11, the bottom plate 13 and the two face plates 14 are all aluminium shells made of aluminium.

Specifically, the side plate 11 has a width D1 extending along the Y-axis direction. The width D1 of the side plate 11 is a thickness of the housing 10. The top cover 12 is fixedly connected to the top sides of the two side plates 11 and the top sides of the two face plates 14. For example, the top cover 12 is a light aluminium sheet, and the top cover 12 can be fixedly connected to the top sides of the two side plates 11 and the top sides of the two face plates 14 by welding. The outside surface of the top cover 12 includes an edge area R121 and a mounting area R122. The edge area R121 surrounds the mounting area R122. Where the edge area R121 has a minimum width of K. The mounting area R122 is configured for assembling with other components. In this embodiment, the top cover 12 includes a top cover body 121 and two bumps 122. An outer periphery of the top cover body 121 is an outer periphery of the top cover 12. The top cover body 121 is fixedly connected to the top sides of the two side plates 11 and the top sides of the two face plates 14. The two bumps 122 are both located in the mounting area R122 and are spaced apart in the X-axis direction. Each bump 122 is convexly disposed on the top cover body 121 and protrudes towards a direction from the side plate 11 to the top cover body 121. A minimum distance between the outer periphery of the bump 122 and the outer periphery of the top cover body 121 is a minimum distance K of the edge area R121.

In this embodiment, the top cover 12 defines a pole hole 12a and a liquid injection hole 12b. The number of the pole holes 12a is two. The two pole holes 12a penetrate through the top cover 12 along the thickness direction of the top cover 12 and are interconnected with the receiving space. The two pole holes 12a are configured to mount the positive pole and negative pole respectively. Specifically, the openings of the two pole holes 12a are located in the two bumps 122 respectively; each pole hole 12a penetrates through the top cover body 121 and the bump 122 along the Z-axis direction. The opening of the liquid injection hole 12b is located in the top cover body 121. The liquid injection hole 12b penetrates through the top cover body 121 along the thickness direction of the top cover body 121 and is interconnected with the receiving space for injecting electrolyte into the receiving space.

In this embodiment, the outer periphery of the top cover body 121 includes a first top cover outer periphery 121a extending along the X-axis direction and a second top cover outer periphery 121b extending along the Y-axis direction. The outer periphery of each bump 122 includes a first bump outer periphery 122a extending along the X-axis direction and a second bump outer periphery 122b extending along the Y-axis direction. In this embodiment, the two bumps 122 are mirror-symmetrical about a center of the top cover body 121. A bump 122 located on the left side provides an example where a minimum distance between the first bump outer periphery 122a of the bump 122 and the first top cover outer periphery 121a of the top cover body 121 is K1, and a minimum distance between the second bump outer periphery 122b of the bump 122 and the second top cover outer periphery 121b of top cover body 121 is K2. A minimum distance between the outer periphery of the bump 122 and the outer periphery of top cover body 121 is a minimum width of edge area R121 with K, where K is a minimum value of K1 and K2.

Figure 6:
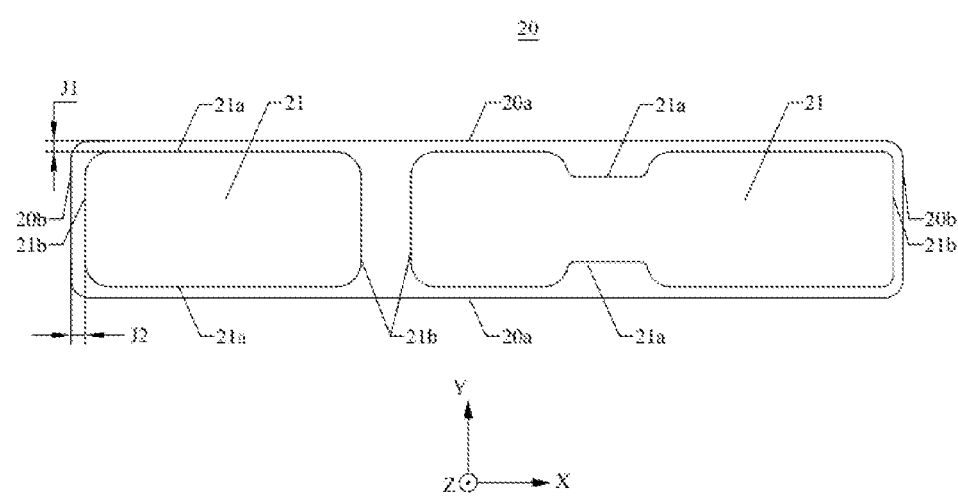
FIG. 6 shows a top view of a top patch in the housing assembly shown in FIG. 4.

Referring to FIGS. 4 and 6 together, FIG. 6 shows a top view of the top patch 20 in the housing assembly 100 shown in FIG. 4.

The top patch 20 is mounted on the top side of the top cover 12 and covers the liquid injection hole 12b. The top patch 20 defines two hollow portions 21. The two hollow portions 21 are spaced apart in the X-axis direction. Each hollow portion 21 penetrates through the top patch 20 along a thickness direction of the top patch 20 and is configured to avoid one bump 122.

In this embodiment, the outer periphery of the top patch 20 includes a first top patch outer periphery 20a extending along the X-axis direction and two second top patch outer peripheries 20b extending along the Y-axis direction. The periphery of each hollow portion 21 includes two first peripheries 21a extending along the X-axis direction and two second peripheries 21a extending along the Y-axis direction. A minimum distance between the first top patch out periphery 20a of the top patch 20 and the first periphery 21a of the hollow portion 21 is J1. A minimum distance between the second top patch outer periphery 20b of the top patch 20 and the second periphery 21b of the hollow portion 21 is J2. A minimum distance between the outer periphery of the top patch 20 and the periphery of the hollow portion 21 is J, where J is a minimum value of J1 and J2.

Figure 7:
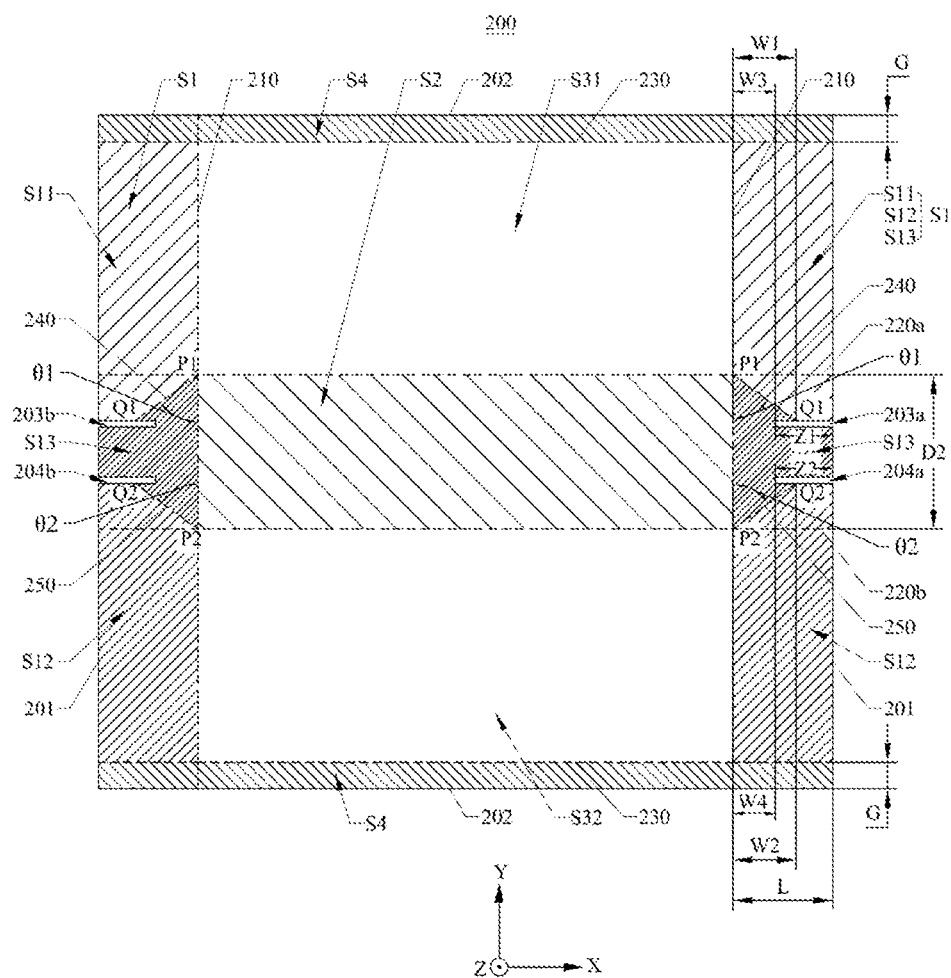
FIG. 7 shows a schematic diagram of a division of an area of an external cladding film in the energy storage device in an unfolded state shown in FIG. 2.
Figure 8:
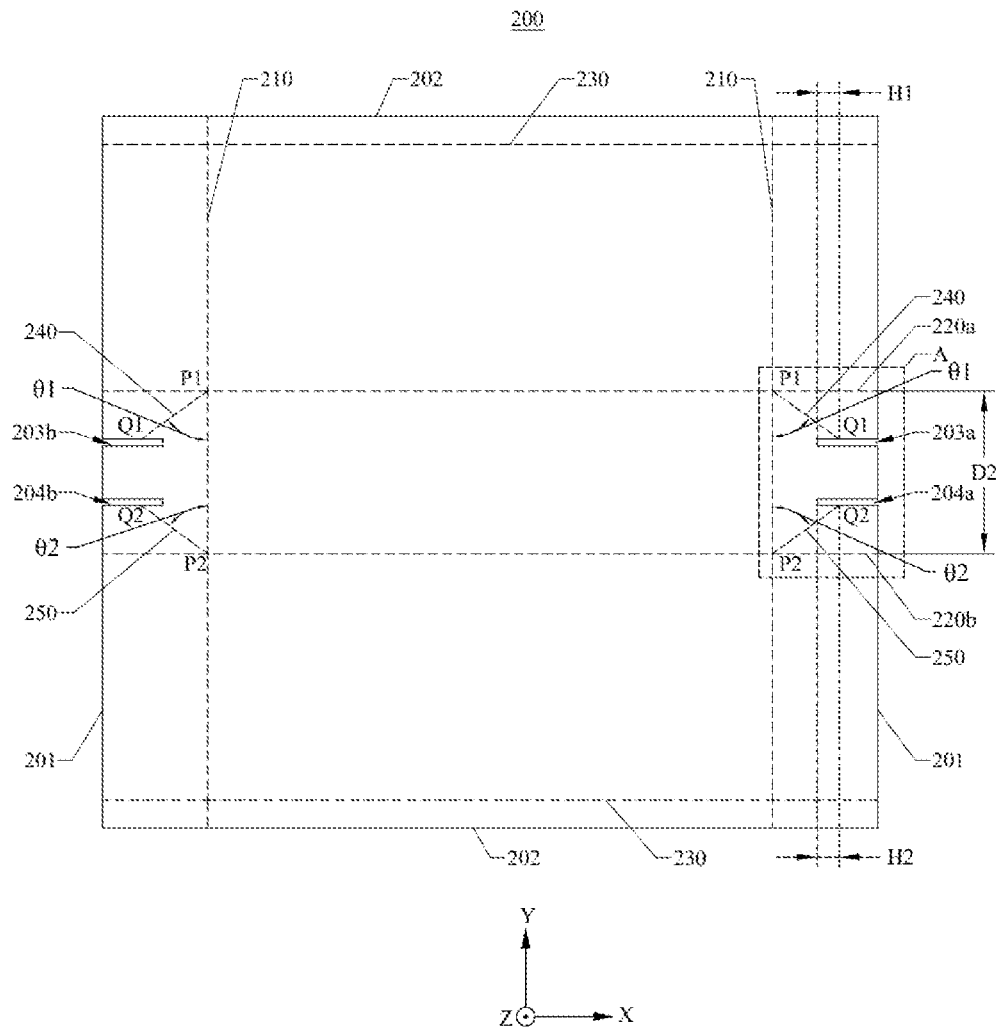
FIG. 8 shows a structural schematic diagram of the external cladding film in the unfolded state shown in FIG. 7

Referring to FIGS. 7 and 8, FIG. 7 shows a schematic diagram of a division of an area of an external cladding film 200 in the energy storage device 1000 in an unfolded state shown in FIG. 2; FIG. 8 shows a structural schematic diagram of the external cladding film 200 in the unfolded state shown in FIG. 7.

The external cladding film 200 includes a main body and a glued layer coated on the main body. The main body is an insulating layer for protecting the housing 10. The glued layer is coated on a side surface of the main body. When the external cladding film 200 is attached to the housing assembly 100, the glued layer faces towards the housing 10, the main body is wrapped around the outside surface of the housing 10, and the top patch 20 covers part of the main body. The "outside surface" of M refers to a surface of M away from its centre.

Specifically, the external cladding film 200 includes two side film sections S1, a bottom film section S2, a first face film section S31, a second face film section S32 and two top film sections S4. In the X-axis direction, the two side film sections S1 are located at opposite ends of the external cladding film 200, and the bottom film section S2 is connected between the two side film sections S1. In the Y-axis direction, the first face film section S31 and the second face film section S32 are located at opposite sides of the bottom film section S2, and are both connected between the two side film sections S1. A top film section S4 is connected to sides of the two side film sections S1 towards the positive direction of the Y-axis, and is connected to the first face film section S31. Another top film section S4 is connected to sides of the two side film sections S1 towards the negative direction of the Y-axis, and is connected to the second face film section S32. Where each side film section S1 is configured to cover an outside surface of the side plate 11, and the bottom film section S2 is configured to cover the outside surface of the bottom plate 13. The first face film section S31 and the second face film section S32 are configured to cover outside surfaces of the two face plates 14 respectively. Each top film section S4 is configured to partially cover an outer periphery of a top surface of the top cover 12.

In each side film section S1, the width of the side film section S1 is L, i.e. the distance between the outer edge of the side film section S1 and the inner edge of the side film section S1 is L. In this embodiment, each side film section S1 includes a first section S11, a second section S12 and a third section S13. In the Y-axis direction, the third section S13 is connected between the first section S11 and the second section S12. The third sections S13 of the two side film sections S1 are connected to opposite sides of the bottom film section S2 respectively. The first section S11 and the second section S12 are configured to alternately fold to cover the side plate 11, and the third section S13 is configured to cover a portion of the side plate 11 close to the bottom plate 13 after the first section S11 and the second section S12 have covered the side plate 11. The width of the first section S11, the second section S12 and the third section S13 are all equal to L. Furthermore, the ratio between L and the width D1 of the side plate 11 satisfies: ½<L/D1<1, such that first section S11 and second section S12 are alternately folded to partially cover each other in order to achieve that the side film section S1 can completely cover the side plate 11, avoiding a problem that the first section S11 and second section S12 exceed the edges of the side plate respectively due to oversize of the first section S11 and second section S12, and thus overlap each other to cover the side plate 11, which causes a problem of crease and bulge after the first section S1 and the second section S2 cover each other, thus providing a consistency of the energy storage device 1000.

The side film section S1 on the right side of the bottom film section S2 defines a first cut groove 203a and a second cut groove 204a. The side film section S1 on the left side of the bottom film section S2 defines a first cut groove 203b and a second cut groove 204a. The first cut groove 203a and the first cut groove 203b are located at opposite sides of the bottom film section S2. The second cut groove 204a and the second cut groove 204b are located at opposite sides of the bottom film section S2. The second cut groove 204a is located at one side of the first cut groove 203a away from the first face film section S31. The second cut groove 204b is located at one side of the first cut groove 203b away from first face film section S31. The first cut groove 203a and the first cut groove 203b may be the same or different. The second cut groove 204a and the second cut groove 204b may be the same or different. The following is an example of the side film section S1, which is located to the right side of the bottom film section S2.

In the side film section S1, the first cut groove 203a and the second cut groove 204a are spaced in the Y-axis direction. The first cut groove 203a and the second cut groove 204a penetrate through the side film section S1 along the thickness direction of the side film section S1, and penetrate through the outer edge of the side film section S1. Specifically, the opening of the first cut groove 203a is located at the outer edge of the side film section S1, and the bottom surface of the first cut groove 203a is spaced from the inner edge of the side film section S1. The opening of the second cut groove 204a is located at the outer edge of the side film section S1 and is spaced from the opening of first cut groove 203a. The bottom surface of the second cut groove 204a is spaced from the inner edge of the side film section S1 and is spaced from the bottom surface of the first cut groove 203a.

In this embodiment, a distance between the bottom surface of the second cut groove 204a and the inner edge of the side film section S1 is equal to a distance between the bottom surface of first cut groove 203a and the inner edge of the side film section S1, i.e., a length of an uncut portion between the bottom surface of the second cut groove 204a and the inner edge of the side film section S1 is equal to a length of an uncut portion between the bottom surface of the first cut groove 203a and the inner edge of the side film section S1 so that the same cutting criteria are configured to cut the first cut groove 203a and the second cut groove 204a.

In other embodiments, the distance between the bottom surface of the second cut groove 204a and the inner edge of the side film section S1 may be equal to the distance between the bottom surface of the first cut groove 203a and the inner edge of side film section S1.

Figure 9:
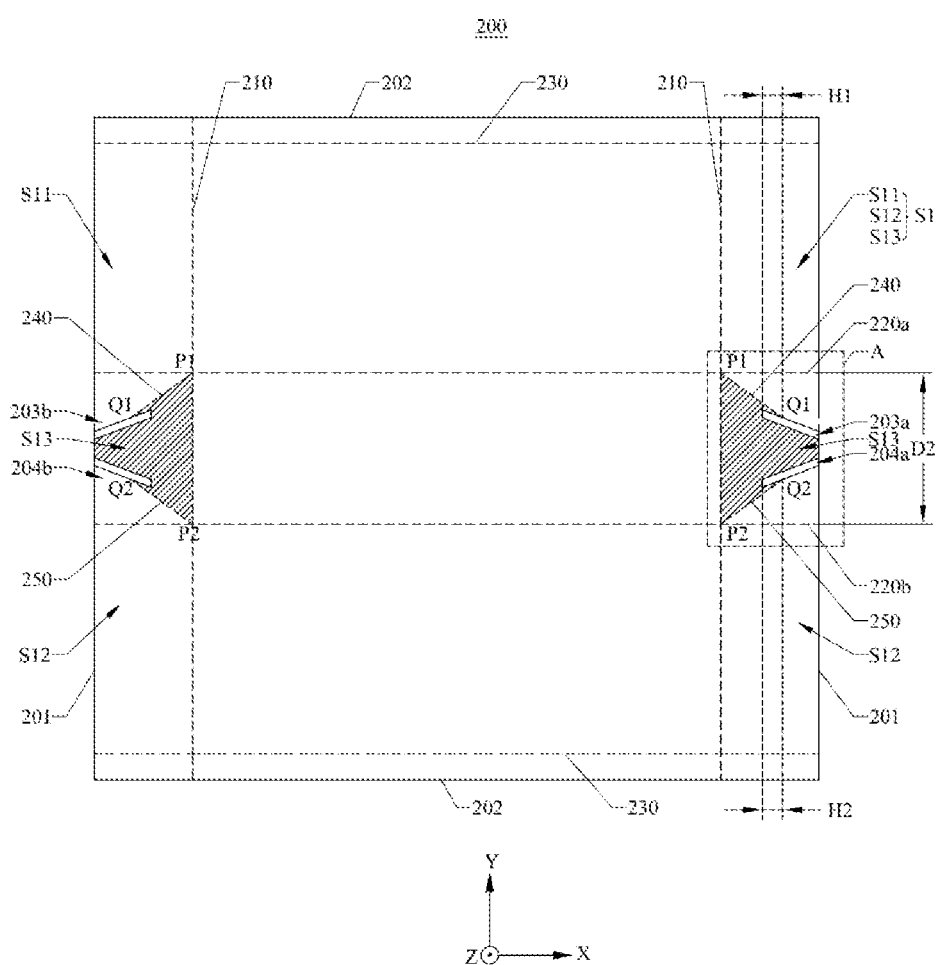
FIG. 9 shows a structural schematic diagram of the external cladding film in the unfolded state in other embodiments.

In this embodiment, an extending direction of the first cut groove 203a is parallel to an extending direction of the second cut groove 204a, i.e. the extending direction from the opening of the first cut groove 203a towards the bottom surface of the first cut groove 203a is parallel to the extending direction from the opening of the second cut groove 203a to the bottom surface of the second cut groove 204a. A cutting device can quickly form the first cut groove 203a and the second cut groove 204a by simply translating the external cladding film 200 without having to adjust an angle. The first cut groove 203a has a groove depth of Z1, i.e. the groove depth from the opening of the first cut groove 203a to the bottom surface of the first cut groove 203a is Z1, which satisfies (2L−D2)<Z1<L. For example, Z1 is 10 mm to 18 mm. In this embodiment, the groove depth Z1 of the first cut groove 203a is 12 mm. The groove depth of the second cut groove 204a is Z2, i.e. the groove depth from the opening of the second cut groove 204a to the bottom surface of the second cut groove 204a is Z2, which satisfies (2L−D2)<Z2<L. For example, Z2 is 10 mm to 18 mm. In this embodiment, the groove depth Z2 of the second cut groove 204a is 12 mm. In some embodiments, a depth extending from the opening of the first cut groove 203a to the bottom surface of the first cut groove 203a is the same as a depth extending from the opening of the second cut groove 204a to the bottom surface of the second cut groove 204a, and all equal to Z, i.e. Z1=Z2=Z and satisfies: (2L−D2)<Z<L. As shown in FIG. 9, FIG. 9 shows a structural schematic diagram of the external cladding film 200 in the unfolded state in other embodiments. In these other embodiments, the extending direction from the opening of the first cut groove 203a to the bottom surface of the first cut groove 203a intersects and is not perpendicular to the outer edge of the side film section S1; the extending direction from the opening of the second cut groove 204a to the bottom surface of the second cut groove 204a intersects and is not perpendicular to the outer edge of the side film section S1, so that the third section S13 has a trapezoid shape with a small top end and a large bottom end. This makes in a tighter fit between the third section S13 and the side plate 11, which is less prone to breakage.

Each side film section S1 also has a first oblique crease 240 and a second oblique crease 250. The first oblique crease 240 is located at one side of the first cut groove 203a away from the second cut groove 204a for folding the first section S11 along the first oblique crease 240. The first oblique crease 240 and the first cut groove 203a cooperatively define the first section S11 and the third section S13. The first oblique crease 240 includes a first fixed end P1 and a first free end Q1. The first fixed end P1 is an intersection of the side film section S1, the first face film section S31 and the bottom film section S2. The first free end Q1 intersects with a side surface of the first cut groove 203a away from the second cut groove 204a, i.e. the first free end Q1 is located between the opening of the first cut groove 203a and the bottom surface of the first cut groove 203a. A distance between the first free end Q1 of the first oblique crease 240 and the bottom surface of the first cut groove 203a is H1, with H1 being greater than 0. In some embodiments, H1 is between 0.1 mm and 5.5 mm, ensuring an overcut amount of the first cut groove 203a compared to the first oblique crease 240, even though the first free end Q1 of the first oblique crease 240 is offset towards the bottom surface of the first cut groove 203a compared to the standard crease, no crease will occur. When bending along the first oblique crease 240 to adhere to the side plate 11, it is possible to squeeze out air bubbles covered by first section S11 when bending to cover the third section S13, further enhancing a reliability of an attachment of the external cladding film 200. For example, H1=1.5 mm.

The second oblique crease 250 is located at one side of the second cut groove 204a away from the first cut groove 203a. The second oblique crease 250 and the second cut groove 204a are both connected between the second section S12 and the third section S13 for folding the second section S12 along the second oblique crease 250. The second oblique crease 250 includes a second fixed end P2 and a second free end Q2. The second fixed end P2 is an intersection of the side film section S1, the second face film section S32 and the bottom film section S2. The second free end Q2 intersects with a side surface of the second cut groove 204a away from the first cut groove 203a, i.e. the second free end Q2 is located between the opening of the second cut groove 204a and the bottom surface of the second cut groove 204a. A distance between the second free end Q2 of the second oblique crease 250 and the bottom surface of second cut groove 204a is H2, with H2 being greater than 0. In some embodiments, H2 is between 0.1 mm and 5.5 mm, ensuring an overcut amount of the second cut groove 204a compared to the second oblique crease 250; even though the second free end Q2 of the second oblique crease 250 is offset towards the bottom surface of the second cut groove 204a compared to the standard crease, no crease will occur. When bending along the second oblique crease 250 to adhere to the side plate 11, it is possible to squeeze out the air bubbles covered by the second section S12 when bending to cover the third section S13, further enhancing a reliability of an attachment of the external cladding film 200. For example, H2=1.5 mm. In this embodiment, H2=H1. In other embodiments, it is possible that H2≠H1.

The bottom film section S2 is connected between the third sections S13 of the two side film sections S1. The width of the bottom film section S2 is D2. The first face film section S31 is connected between the first sections S13 of the two side film sections S1. The second face film section S32 is connected between the second sections S11 of the two side film sections S1. One of the two top film sections S4 is connected to ends of the first sections S11 of the two side film sections S1 away from the second sections S12, and the other of the two top film sections S4 is connected to ends of the second sections S12 of the two side film sections S1 away from the first sections S11. In each top film section S4, the maximum width of the top film section S4 is G, i.e. the maximum distance between the outer edge of the top film section S4 and the inner edge of the top film section S4 is G.

In this embodiment, the external cladding film 200 is integrated molding and is rectangular in shape, which facilitates the cutting and forming of the external cladding film 200, reduces processing procedures and lowers costs. The external cladding film 200 includes two first edges 201 and two second edges 202. The two first edges 201 are set opposite to each other in the X-axis direction, and the two first edges 201 are outer edges of the two side film sections S1. Each first edge 201 extends along the Y-axis direction. The two second edges 202 are set opposite to each other in the Y-axis direction, and the two second edges 202 are outer edges of the two top film sections S4. Each second edge 202 extends along the X-axis direction.

The external cladding film 200 includes two side edge creases 210, a first bottom edge crease 220a, a second bottom edge crease 220b and two top edge creases 230. The two side edge creases 210, the two top edge creases 230 and the two first edges 201 cooperatively define the two side film sections S1 respectively. The two side edge creases 210, the first bottom edge crease 220a, and the second bottom edge crease 220b cooperatively define the bottom film section S2. The two side edge creases 210, the first bottom edge crease 220a and one top edge crease 230 cooperatively define the first face film section S31. The two side edge creases 210, the second bottom edge crease 220b, and one top edge crease 230 cooperatively define the second face film section S32. The two top edge creases 230, the two first edges 201 and the two second edges 202 define the two top film sections S4, respectively.

Specifically, the two side edge creases 210 are located between the two first edges 201 and are spaced apart in the X-axis direction. The two side edge creases 210 are inner edges of the two side film sections S1. A distance between the side edge crease 210 and the first edge 201 is the width L of the side film section S1. Each side film section S1 is foldable along one side edge crease 210 compared to the bottom film section S2. In each side film section S1, along a direction extending from the first fixed end P1 towards the first free end Q1, an angle between the first oblique crease 240 and the side edge crease 210 is θ1, 25°≤θ1≤75°. In the direction extending from the second fixed end P2 towards the second free end Q2, an angle between the second oblique crease 250 and the side edge crease 210 is θ2, 25°≤θ2≤75°. In this embodiment, the two side edge creases 210 both extend along the Y-axis direction, and both extend from one second edge 202 to the other second edge 202. In each side film section S1, a distance between the side edge crease 210 and the first free end Q1 of the first oblique crease 240 is W1, and the distance between the side edge crease 210 and the second free end Q2 of the second oblique crease 250 is W2, with W1 and W2 being equal. A distance between the side edge crease 210 and the bottom surface of the first cut groove 203a is W3, and a distance between the side edge crease 210 and the bottom surface of the second cut groove 204a is W4, with W3 and W4 being equal.

The first bottom edge crease 220a and the second bottom edge crease 220b are both located between the two second edges 202, and are spaced apart in the Y-axis direction. The first bottom edge crease 220a is connected between the bottom film section S2 and the first face film section S31. The second bottom edge crease 220b is connected between the bottom film section S2 and the second face film section S32. The first face film section S31 is foldable along the first bottom edge crease 220a compared to the bottom film section S2. The second face film section S32 is foldable along the second bottom edge crease 220b compared to the bottom film section S2. The distance between the first bottom edge crease 220a and the second bottom edge crease 220b is the width D2 of the bottom film section S2. D2 is substantially equal to the width D1 of the side plate 11.

In this embodiment, the first bottom edge crease 220a and the second bottom edge crease 220b both extend along the X-axis direction and both extend from one first edge 201 to the other first edge 201. An intersection of the first bottom edge crease 220a with one side edge crease 210 is the first fixed end P1. An intersection of the second bottom edge crease 220b with another side edge crease 210 is the second fixed end P2.

Specifically, the two top edge creases 230 are located between the two second edges 202, and are located at two sides of the first bottom edge crease 220a and the second bottom edge crease 220b. The two top edge creases 230 are located at opposite ends of the two side film sections S1 respectively and are connected between the two side film sections S1 and the two top film sections S4. The two top edge creases 230 are inner edges of the two top film sections S respectively. A distance between the top edge crease 230 and the second edge 202 is the maximum width G of the top film section S4. In this embodiment, the two top edge creases 230 are located along the X-axis direction, and both extend from one first edge 201 to the other first edge 201.

Figure 10:
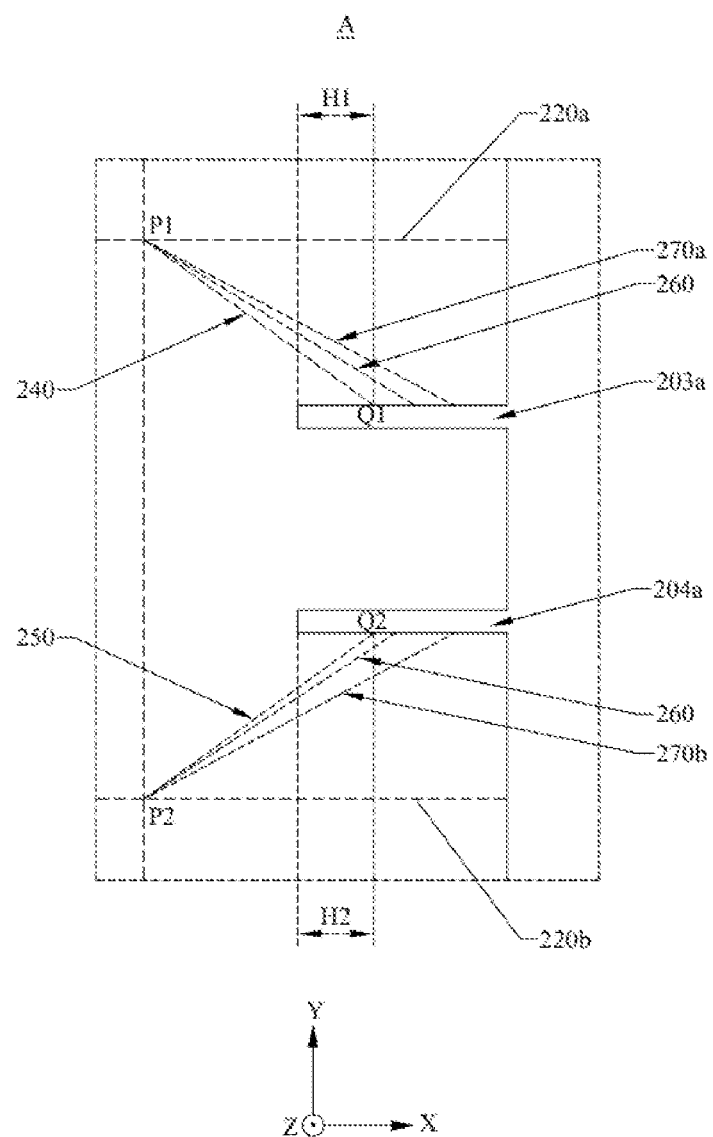
FIG. 10 shows a partially enlarged view of part A of the external cladding film shown in FIG. 8.

Referring to FIG. 10 together, FIG. 10 shows a partially enlarged view of part A of the external cladding film 200 shown in FIG. 8.

It should be noted that the first oblique crease 240 and second oblique crease 250 are usually formed using a folding device. Before forming the first oblique crease 240 and the second oblique crease 250, the standard crease 260 is usually pre-defined on the external cladding film 200. Since the first free end Q1 of the actual crease of the first oblique crease 240 and the second oblique crease 250 may be offset on both sides of the standard crease 260 when the actual crease is made, as in this embodiment, the first free end Q1 of the first oblique crease 240 (the actual crease) is offset in a direction from the standard crease 260 towards one side of the bottom surface of the first cut groove 203a, i.e. there is a situation where the actual crease of the first oblique crease 240 is overfolded compared to the standard crease 260. In other embodiments, the first free end of the first oblique crease 270a made actually may also be offset in a direction from the standard crease 260 towards one side of the opening of the first cut groove 203a, i.e. it may appear that the actual crease of the first oblique crease 270a is too small compared to the standard crease 260. By setting the distance between the first free end Q1 of the first oblique crease 240 and the bottom surface of the first cut groove 203a to be H1, i.e. by setting the distance of the bottom surface of the first cut groove 203a exceeding the first free end Q1 of the first oblique crease 240 to be H1 which is greater than 0, ensuring that when the folding device makes the first oblique crease 240, regardless of the first free end Q1 of the actual crease of the first oblique crease 240 is offset towards either side of two sides of the standard crease 260, the first free end Q1 of the first oblique crease 240 will not exceed the bottom surface of the first cut groove 203a, i.e. the first free end Q1 of the first oblique crease 240 falls between the opening of the first cut groove 203a and the bottom surface of the first cut groove 203a, thereby ensuring that the first section S11 in the side film section S1 always fits closely to the side plate 11 without crease.

In this embodiment, the second free end Q2 of the second oblique crease 250 (the actual crease) is offset in a direction from the standard crease 260 towards the bottom surface of the second cut groove 204a, i.e. there is a situation where the actual crease of the second oblique crease 250 is overfolded compared to the standard crease 260. In other embodiments, the second free end of the second oblique crease 270b made actually may also be offset in a direction from the standard crease 260 towards the opening of the second cut groove 204a, i.e. there is a situation where the actual crease of the second oblique crease 270b is too small compared to the standard crease 260. By setting a distance between the second free end Q2 of the second oblique crease 250 and the bottom surface of the second cut groove 204a to be H2, i.e. by setting the distance of the bottom surface of second cut groove 204a exceeding the second free end Q2 of the second oblique crease 250 to be H2 which is greater than 0, ensuring that when the folding device makes the second oblique crease 250, regardless of the second free end Q2 of the actual crease of the second oblique crease 250 is offset towards either side of two sides of the standard crease 260, the second free end Q2 of the second oblique crease 250 does not exceed the bottom surface of the second cut groove 204a, i.e. the second free end Q2 of the second oblique crease 250 falls between the opening of the second cut groove 204a and bottom surface of the second cut groove 204a, thus ensuring that the second section S12 in the side film section S1 can fit closely to the side plate 11 without crease.

Furthermore, even if H2 #H1, i.e. the second free end Q2 of the second oblique crease 250 and the first free end Q1 of the first oblique crease 240 have different offsets compared to the standard crease 260, it is still possible to make the first section S11 and the second section S12 fold alternately to cover the side plate 11 without crease, avoiding a problem of bulging out of a portion covering the side plate 11 due to crease and facilitating a consistency of the energy storage device 1000 and thus improving a service life of the electrical equipment 1. The offset difference refers to a different direction of offset and/or a different amount of offset.

In the external cladding film 200 provided in the present disclosure, the side film section S1 may be folded along the first oblique crease 240 and second oblique crease 250 to cover the side plate 11 of the energy storage device 1000. The actual creases of the first oblique crease 240 and the second oblique crease 250 are usually made with a predefined standard crease. During an actual making, the first free end Q1 of the first oblique crease 240 and the second free end Q2 of the second oblique crease 250 are usually offset from standard crease 260, and degrees of offset compared to the standard crease 260 may be different, thus easily causing a problem that the side film section S1 is prone to misalignment when covered. In the present disclosure, by setting the first cut groove 203a in the side film section S1 and setting a distance of the bottom surface of the first cut groove 203a exceeding the first free end Q1 of the first oblique crease 240 to be greater than 0, it is ensured that, when making the first oblique crease 240, regardless of the fact that the first free end Q1 of the actual crease of the first oblique crease 240 is offset towards either of the two sides of the standard crease 260, the first free end Q1 of the first oblique crease 240 does not exceed the bottom surface of the first cut groove 203a, i.e. ensuring that first cut groove 203a is overcut compared to the first oblique crease 240, thereby ensuring that the first section S11 (i.e. the area of the side film section S1 located at one side of the first cut groove 203a away from the second cut groove 204a) in the side film section S1 fits closely to the side plate 11 without crease, thus further ensuring that first section S11 does not easily misalign when covering the side plate 11. At the same time, by setting the second cut groove 204a in the side film section S1 and setting a distance of the bottom surface of the second cut groove 204a exceeding the second free end Q2 of the second oblique crease 250 to be greater than 0, it is ensured that, when making the second oblique crease 250, regardless of the fact that the second free end Q2 of the actual crease of the second oblique crease 250 is offset towards either of the two sides of the standard crease 260, the second free end Q2 of the second oblique crease 250 does not exceed the bottom surface of the second cut groove 204a, i.e. ensuring that the second cut groove 204a is overcut compared to the second oblique crease 250, thus further ensuring that the second section S12 (i.e. the area of the side film section S1 located at one side of the second cut groove 204a away from the first cut groove 203a) in the side film section S1 can fit closely to the side plate 11 without crease, thus further ensuring that the second section S12 does not easily misalign when covering the side plate 11.

In addition, even if the offset of the first oblique crease 240 and the second oblique crease 250 is different compared to the standard crease 260, it is still possible to ensure that the side film section S1 covering without crease and avoids a problem of bulging when covering the side plate 11, which ensures that the side film section S1 is not prone to misalignment when covering the side plate 11, thus providing the consistency of the energy storage device 1000 and helping to improve a service life of the electrical equipment 1.

In addition, the external cladding film 200 does not require the bottom film section S2 to be folded, so that the outside surface of the bottom plate 13 can be fully covered by the bottom film section S2, which avoids a problem of crease due to fold when covering the bottom plate 13, thus further providing a consistency of the energy storage device 1000.

Figure 11:
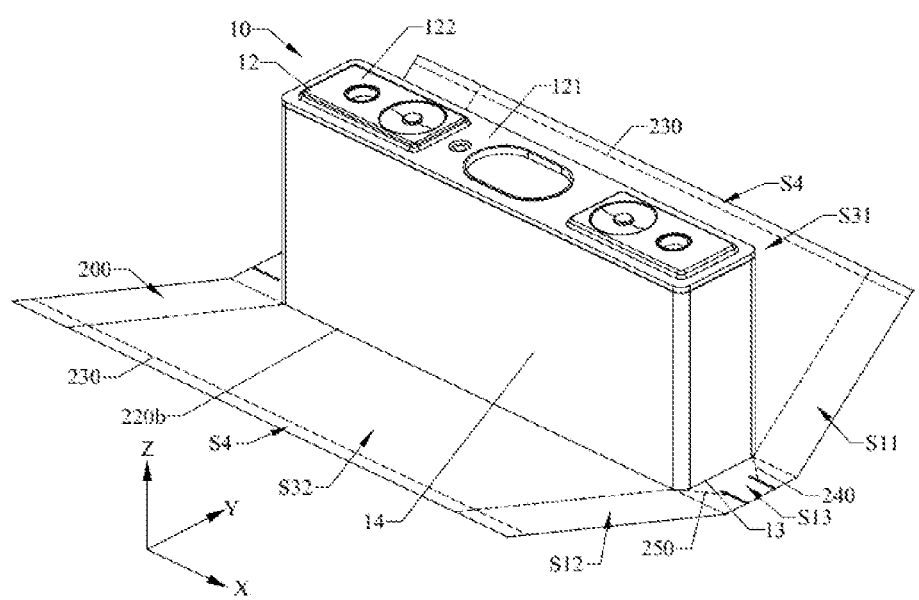
FIG. 11 shows a structural schematic diagram of the housing assembled with the external cladding film in the energy storage device shown in FIG. 2.
Figure 12:
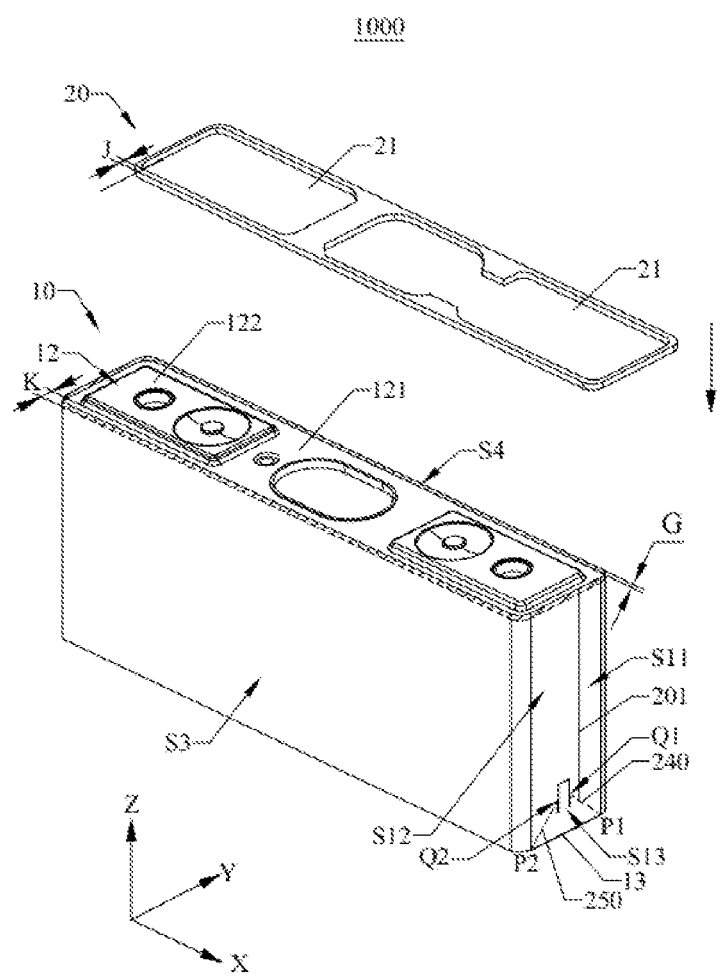
FIG. 12 shows a structural schematic diagram of an assembly structure shown in FIG. 11 with a top cover patch assembled to form the energy storage device.

Referring to FIGS. 11 and 12, FIG. 11 shows a structural schematic diagram of the housing 10 assembled with the external cladding film 200 in the energy storage device 1000 shown in FIG. 2; FIG. 12 shows a structural schematic diagram of an assembly structure shown in FIG. 11 with a top patch 20 assembled to form the energy storage device 1000.

When assembling the energy storage device 1000, the bottom plate 13 of the housing 10 is placed on the bottom film section S2 of the external cladding film 200, the glued layer of the external cladding film 200 is placed towards the housing 10, the two edges of the bottom plate 13 in the X-axis direction are placed in correspondence with the first bottom edge crease 220a (see FIG. 7) and the second bottom edge crease 220b; the two edges of the bottom plate 13 in the Y-axis direction are placed in correspondence with the two side edge creases 210 to achieve the bottom film section S2 to bond and cover of the bottom plate 13. It is not necessary to fold the bottom film section S2 to achieve full coverage of the outside surface of the bottom plate 13 using the bottom film section S2 of the external cladding film 200, avoiding a problem of crease due to fold when covering the bottom plate 13. The external cladding film 200 is bent along the first bottom edge crease 220a and the second bottom edge crease 220b (see FIG. 7) towards the housing 10 of the energy storage device, respectively, so that the first face film section S31 and the second face film section S32 are bonded and cover the two face plates 14, respectively. At this time, the top peripheral surface of the face plate 14 is placed in correspondence with the top edge crease 230, i.e. the peripheral surface of the top cover 12 is placed in correspondence with the top edge crease 230.

The first section S11 in the side film section S1 is folded along the first oblique crease 240. A part of the first section S11 is bonded to the outside surface of the side plate 11, and another part of the first section S11 is bonded to the third section S13. The second section S12 in the side film section S1 is folded along the second oblique crease 250. A part of the second section S12 is bonded to the outside surface of the side plate 11 a surface of the first section S11 away from the side plate 11, and another part of the second section S12 is bonded to the third section S13 and to a surface of the first section S11 away from the third section S13 that is bonded to the third section S13. The third section S13 is rotated around the Y-axis direction from the bottom side towards the top side and bonded to the surface of the second section S12 away from the side plate 11 and the surface of the first section S11 away from the side plate 11, to achieve the side film section S1 to bond and cover the side plate 11. At this time, the third section S13 covers the part of the side plate 11 close the bottom side. Also, as shown in FIG. 10, the distance H1 between the first free end Q1 of the first oblique crease 240 and the bottom surface of the first cut groove 203a and the distance H2 between the second free end Q2 of the second oblique crease 250 and the bottom surface of the second cut groove 204a are equal. At the same time, because a direction of the third section S13 bonded to the side plate 11 is the bottom side fitting towards the top side, the third section S13 may be pressed in the downward direction as the housing 10 is gap-fitly inserted into the slot from the direction of the top side to modularly assemble the energy storage device 1000, and will not warp.

Figure 13:
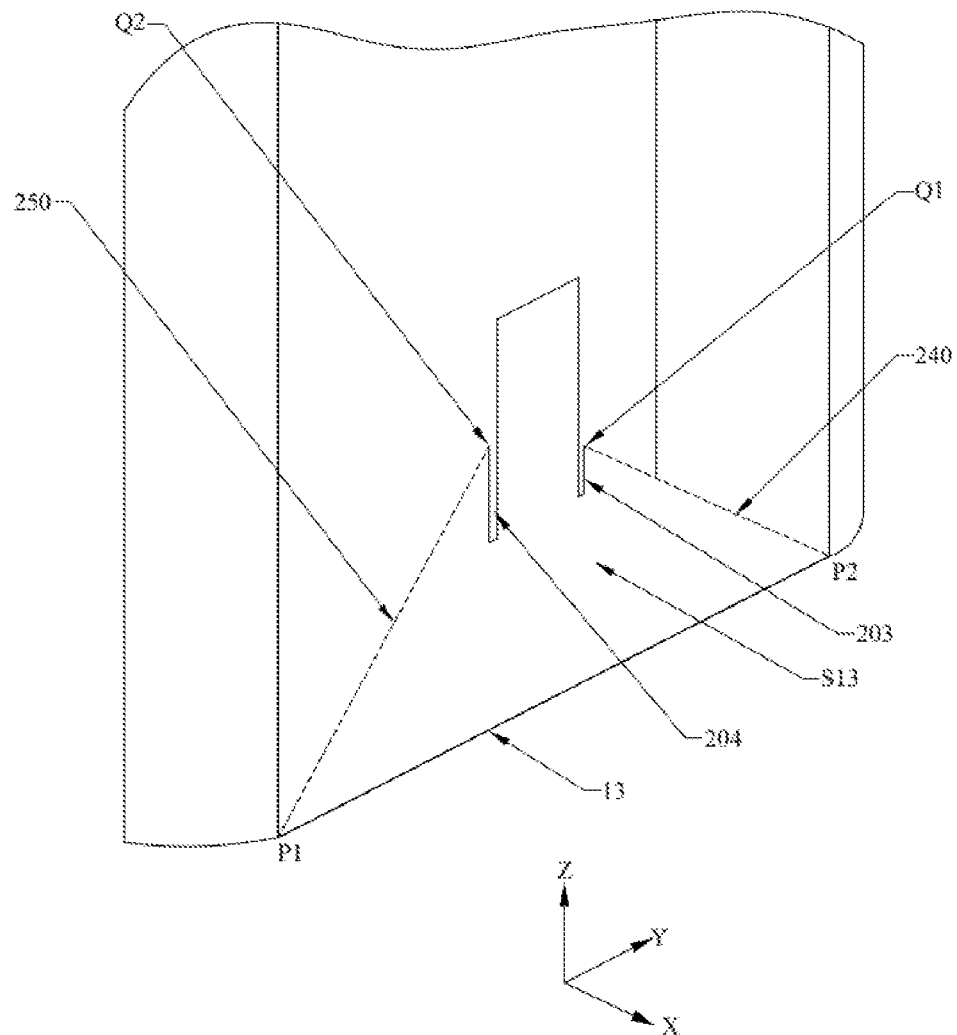
FIG. 13 shows a structural schematic diagram of a part of the side film section bonded to the outside surface of the side plate in some other embodiments.

As shown in FIG. 13, FIG. 13 shows a structural schematic diagram of part of the side film section S1 bonded to the outside surface of the side plate 11 in some other embodiments. In these other embodiments, a distance between the first free end Q1 of the first oblique crease 240 and the bottom surface of the first cut groove 203a and a distance between the second free end Q2 of the second oblique crease 250 and the bottom surface of the second cut groove 204a is different; there is a height difference between the first free end Q1 of the first oblique crease 240 and the second free end Q2 of the second oblique crease 250 in the Z-axis direction, it is folded along the first oblique crease 240 and the second oblique crease 250. When folding along the first oblique crease 240 and the second oblique crease 250, a distance between the first free end Q1 of the first oblique crease 240 and the bottom plate 13 and a distance between the second free end Q2 of the second oblique crease 250 and the bottom plate 13 are different.

Continuing to refer to FIGS. 11 and 12, the top film section S4 is folded towards the top cover 12 along the two top edge creases 230 to bond the glue layer of the top film section S4 to the outside surface of the top cover body 121 away from the side plate 11, to achieve the top film section S4 to be bonded to the edge area of the outside surface of the top cover 12. The maximum width G of the top film section S4 and the minimum width K of the edge area of top cover 12 (i.e. the minimum distance K between the outer periphery of bump 122 and the outer periphery of the top cover 12) are satisfied: G≤K, so that the top film section S4 can cover part of the edge area while exposing the mounting area to avoid interference with the components in the mounting area, i.e. the top film section S4 can cover part of top cover body 121 and exposes the bumps 122 to avoid interference with the bumps 122.

The top patch 20 is mounted on the surface of the top cover 12 away from the side plate 11 in the negative direction of the Z-axis (direction of the arrow in FIG. 12), and the top patch 20 completely covers the surface of the top film section S4. Specifically, the top patch 20 is mounted on a surface of top cover body 121 away from the side plate 11. The minimum distance J between the outer peripheral surface of the top patch 20 and the outer peripheral surface of the inner wall of the hole of the hollow portion 21 and the maximum width G of the top film section S4 is satisfied: G<J, such that the top patch 20 can completely cover the top film section S4 and the top film section S4 will not be exposed from the hollow portion 21 of the top patch 20, thereby avoiding warping of the top film section S4 caused by subsequent process operations. In this embodiment, the minimum distance J between the outer peripheral surface of the top patch 20 and the outer peripheral surface of the inner wall of the hole of the hollow portion 21, the maximum width G of the top film section S4, and the minimum distance K between the outer peripheral surface of the bump 122 and the outer peripheral surface of the top cover body 121 also satisfy: G<J<K, avoiding the outer periphery of the top patch 20 from exceeding the outer periphery of top cover body 121 after the top patch 20 is stacked, causing peeling, while achieving two hollow portions 21 to sleeve on the outer periphery of the two bumps 122 to expose the two bumps 122. Furthermore, in this embodiment, G, J and K further satisfy: (K−J)<(J−G) to enable the top patch 20 to not only completely envelop the top film section S4 but also to partially fit the top surface of the top cover to further compress the top film section S4 and avoid warping of the top film section S4.

The above disclosure is only a preferred embodiment of the present disclosure, which of course cannot be used to limit the scope of the present disclosure. A person of ordinary skill in the art can understand that all or part of the process for realizing the above embodiment, and equivalent changes made in accordance with the claims of the present disclosure, still fall within the scope of the present disclosure.

What is claimed is:

1. An energy storage device (1000) comprising an external cladding film (200) and a housing (10); the external cladding film (200) comprising a main body and a glued layer coated on the main body; wherein the housing (10) comprises a bottom plate (13), two face plates (14) opposite to each other, and two side plates (11) opposite to each other; the bottom plate (13) is fixedly connected to bottom sides of the two side plates (11); the two face plates are fixedly connected between the two side plates (11) and are both fixedly connected to the bottom plate (13); the external cladding film (200) comprises two side film sections (S1), a bottom film section (S2), a first face film section (S31) and a second face film section (S32); the two side film sections (S1) are located at opposite ends of the external cladding film (200) and cover outside surfaces of the two side plates (11); the bottom film section (S2) is connected between the two side film sections (S1) and covers an outside surface of the bottom plate (13); the first face film section (S31) and the second face film section (S32) are located at opposite ends of the bottom film section (S2), and are both connected between the two side film sections (S1), and cover outside surfaces of the two face plates (14) respectively;

wherein each side film section (S1) defines a first cut groove (203a, 203b) and a second cut groove (204a, 204b) spaced from the first cut groove (203a, 203b); the first cut groove (203a, 203b) and the second cut groove (204a, 204b) both penetrate through the side film section (S1) along a thickness direction of the side film section (S1), and penetrate through an outer edge of the side film section (S1); a bottom surface of the first cut groove (203a, 203b) and a bottom surface of the second cut groove (204a, 204b) are both spaced from inner edges of the side film sections (S1); the first cut grooves (203a, 203b) of the two side film sections (S1) are located at opposite sides of the bottom film section (S2); the second cut grooves (204a, 204b) of the two side film sections (S1) are located at opposite sides of the bottom film section (S2) and located at one side of the first cut groove (203a, 203b) away from the first face film section (S31);

wherein each side film section (S1) comprises a first oblique crease (240, 270a) and a second oblique crease (250, 270b); the first oblique crease (240, 270a) is located at one side of the first cut groove (203a, 203b) away from the second cut groove (204a, 204b); the first oblique crease (240, 270a) comprises a first fixed end (P1) and a first free end (Q1); the first fixed end (P1) is an intersection of the side film section (S1), the first face film section (S31) and the bottom film section (S2); the first free end (Q1) intersects with a side surface of the first cut groove (203a, 203b); a distance between the first free end (Q1) and the bottom surface of the first cut groove (203a, 203b) is greater than 0;

wherein the second oblique crease (250, 270b) is located at one side of the second cut groove (204a, 204b) away from the first cut groove (203a, 203b); the second oblique crease (250, 270b) comprises a second fixed end (P2) and a second free end (Q2); the second fixed end (P2) is an intersection of the side film section (S1), the second face film section (S32) and the bottom film section (S2); the second free end (Q2) intersects with a side surface of the second cut groove (204a, 204b); a distance between the second free end (Q2) and the bottom surface of the second cut groove (204a, 204b) is greater than 0.

2. The energy storage device (1000) according to claim 1, wherein: in each side film section (S1), a distance between the first free end (Q1) and the bottom surface of the first cut groove (203a, 203b) is H1, 0.1 mm≤H1≤5.5 mm; and a distance between the second free end (Q2) and the bottom surface of the second cut groove (204a, 204b) is H2, 0.1 mm≤H2≤5.5 mm.

3. The energy storage device (1000) according to claim 1, wherein: in each side film section (S1), in a direction extending from the first fixed end (P1) to the first free end (Q1), an angle between the first oblique crease (240, 270a) and the inner edge of the side film section (S1) is θ1, 15°≤θ1≤75°; and in a direction extending from the second fixed end (P2) to the second free end (Q2), an angle between the second oblique crease (250, 270b) and the inner edge of the side film section (S1) is θ2, 15°≤θ2≤75°.

4. The energy storage device (1000) according to claim 1, wherein in each side film section (S1), a distance between the first free end (Q1) and the inner edge of the side film section (S1) is W1, a distance between the second free end (Q2) and the inner edge of the side film section (S1) is W2, W1 and W2 are equal.

5. The energy storage device (1000) according to claim 1, wherein in each side film section (S1), a distance between the bottom surface of the first cut groove (203a, 203b) and the inner edge of the side film section (S1) is W3, and a distance between the bottom surface of the second cut groove (204a, 204b) and the inner edge of the side film section (S1) is W4, W3 and W4 are equal.

6. The energy storage device (1000) according to claim 5, wherein a depth extending from an opening of the first cut groove (203a, 203b) to the bottom surface of the first cut groove (203a, 203b) is Z1, 10 mm≤Z1≤18 mm; and a depth extending from an opening of the second cut groove (204a, 204b) to the bottom surface of the second cut groove (204a, 204b) is Z2, 10 mm≤Z2≤18 mm.

7. The energy storage device (1000) according to claim 1, wherein an extending direction from an opening of the first cut groove (203a, 203b) to the bottom surface of the first cut groove (203a, 203b) is parallel to an extending direction from an opening of the second cut groove (204a, 204b) to the bottom surface of the second cut groove (204a, 204b).

8. The energy storage device (1000) according to claim 1, wherein: an extending direction from an opening of the first cut groove (203a, 203b) to the bottom surface of the first cut groove (203a, 203b) intersects and is not perpendicular to the outer edge of the side film section (S1); and an extending direction from an opening of the second cut groove (204a, 204b) to the bottom surface of the second cut groove (204a, 204b) intersects and is not perpendicular to the outer edge of the side film section (S1).

9. The energy storage device (1000) according to claim 1, wherein in each side film section (S1), a distance between the outer edge of the side film section (S1) and the inner edge of the side film section (S1) is L, and each side plate (11) has a width D1 extending along a thickness direction of the housing (10), satisfying: ½<L/D1<1.

10. The energy storage device (1000) according to claim 1, wherein: each side film section (S1) comprises a first section (S11), a second section (S12) and a third section (S13); the third section (S13) is connected between the first section (S11) and the second section (S12); the first oblique crease (240, 270a) and the first cut groove (203a, 203b) cooperatively define the first section (S11) and the third section (S13); the second oblique crease (250, 270b) and the second cut groove (204a, 204b) cooperatively define the second section (S12) and the third section (S13); and third sections (S13) of the two side film sections (S1) are connected to opposite sides of the bottom film section (S2) respectively.

11. The energy storage device (1000) according to claim 1, wherein: the housing (10) further comprises a top cover (12); the top cover (12) is located opposite to the bottom plate (13) and is fixedly connected to top sides of the two side plates (11) and the two face plates (14); the external cladding film (200) further comprises two top film sections (S4); one of the top film sections (S4) is fixedly connected to one side of the two side film sections (S1) and is connected to the first face film section (S31); the other of the top film sections (S4) is connected to the other side of the two side film sections (S1) and is connected to the second face film section (S32); and the two top film sections (S4) covers an outer peripheral edge of a top surface of the top cover (12).

12. The energy storage device (1000) according to claim 11, wherein: a top surface of the top cover (12) comprises a mounting area (R122) and an edge area (R121) surrounding the mounting area (R122); the two top film sections (S4) at least partially cover the edge area (R121); and a minimum width of the edge area (R121) is K, and a maximum width of each top film section (S4) is G, G≤K.

13. The energy storage device (1000) according to claim 12, wherein: the energy storage device (1000) further comprises a top patch (20); the top patch (20) is attached to a top surface of the top cover (12) away from each side plate (11) and covers each top film section (S4); the top patch (20) defines a hollow portion (21); the hollow portion (21) penetrates through the top patch (20) along a thickness direction of the top patch (20); and a minimum distance between an outer periphery of the top patch (20) and a periphery of the hollow portion (21) is J, G<J.

14. The energy storage device (1000) according to claim 13, wherein G<J<K.

15. The energy storage device (1000) according to claim 13, wherein (K−J)<(J−G).

16. The energy storage device (1000) according to claim 1, wherein in each side film section (S1), a distance between the outer edge of the side film section (S1) and the inner edge of the side film section (S1) is L, a depth extending from an opening of the first cut groove (203a, 203b) to the bottom surface of the first cut groove (203a, 203b) is Z1, and a width of the bottom film section (S2) is D2, where (2L−D2)<Z1<L.

17. The energy storage device (1000) according to claim 1, wherein in each side film section (S1), a distance between the outer edge of the side film section (S1) and the inner edge of the side film section (S1) is L, and a depth extending from an opening of the second cut groove (204a, 204b) to the bottom surface of the second cut groove (204a, 204b) is Z2, and a width of the bottom film section (S2) is D2, where (2L−D2)<Z2<L.

18. Electrical equipment having an energy storage device, the energy storage device supplying power to the electrical equipment;
wherein the energy storage device (1000) comprises an external cladding film (200) and a housing (10); the external cladding film (200) comprises a main body and a glued layer coated on the main body;
wherein the housing (10) comprises a bottom plate (13), two face plates (14) opposite to each other, and two side plates (11) opposite to each other; the bottom plate (13) is fixedly connected to bottom sides of the two side plates (11); the two face plates are fixedly connected between the two side plates (11) and are both fixedly connected to the bottom plate (13); the external cladding film (200) comprises two side film sections (S1), a bottom film section (S2), a first face film section (S31) and a second face film section (S32); the two side film sections (S1) are located at opposite ends of the external cladding film (200) and cover outside surfaces of the two side plates (11);
the bottom film section (S2) is connected between the two side film sections (S1) and covers an outside surface of the bottom plate (13); the first face film section (S31) and the second face film section (S32) are located at opposite ends of the bottom film section (S2), and are both connected between the two side film sections (S1), and cover outside surfaces of the two face plates (14) respectively;
wherein each side film section (S1) defines a first cut groove (203a, 203b) and a second cut groove (204a, 204b) spaced from the first cut groove (203a, 203b); the first cut groove (203a, 203b) and the second cut groove (204a, 204b) both penetrate through the side film section (S1) along a thickness direction of the side film section (S1), and penetrate through an outer edge of the side film section (S1); a bottom surface of the first cut groove (203a, 203b) and a bottom surface of the second cut groove (204a, 204b) are both spaced from inner edges of the side film sections (S1); the first cut grooves (203a, 203b) of the two side film sections (S1) are located at opposite sides of the bottom film section (S2); the second cut grooves (204a, 204b) of the two side film sections (S1) are located at opposite sides of the bottom film section (S2) and located at one side of the first cut groove (203a, 203b) away from the first face film section (S31);
wherein each side film section (S1) comprises a first oblique crease (240, 270a) and a second oblique crease (250, 270b); the first oblique crease (240, 270a) is located at one side of the first cut groove (203a, 203b) away from the second cut groove (204a, 204b); the first oblique crease (240, 270a) comprises a first fixed end (P1) and a first free end (Q1); the first fixed end (P1) is an intersection of the side film section (S1), the first face film section (S31) and the bottom film section (S2); the first free end (Q1) intersects with a side surface of the first cut groove (203a, 203b); a distance between the first free end (Q1) and the bottom surface of the first cut groove (203a, 203b) is greater than 0;
wherein the second oblique crease (250, 270b) is located at one side of the second cut groove (204a, 204b) away from the first cut groove (203a, 203b); the second oblique crease (250, 270b) comprises a second fixed end (P2) and a second free end (Q2); the second fixed end (P2) is an intersection of the side film section (S1), the second face film section (S32) and the bottom film section (S2); the second free end (Q2) intersects with a side surface of the second cut groove (204a, 204b); and a distance between the second free end (Q2) and the bottom surface of the second cut groove (204a, 204b) is greater than 0.

19. An external cladding film (200), for attaching a housing (10) of an energy storage device (1000), the external cladding film (200) comprises a main body and a glued layer coated on the main body; wherein the housing (10) comprises a bottom plate (13), two face plates (14) opposite to each other and two side plates (11) opposite to each other; the bottom plate (13) is fixedly connected to bottom sides of the two side plates (11); the two face plates (14) are fixedly connected between the two side plates (11) and are both fixedly connected to the bottom plate (13); the external cladding film (200) comprises two side film sections (S1), a bottom film section (S2), a first face film section (S31) and a second face film section (S32); the two side film sections (S1) are located at opposite sides of the external cladding film (200), and are configured to cover outside surfaces of the two side plates (11) respectively; the bottom film section (S2) is connected between the two side film sections (S1) and is configured to cover an outside surface of the bottom plate (13); the first face film section (S31) and the second face film section (S32) are located at opposite sides of the bottom film section (S2) and are both connected between the two side film sections (S1) and are configured to cover outside surfaces of the two face plates (14) respectively;
wherein each side film section (S1) defines a first cut groove (203a, 203b) and a second cut groove (204a, 204b) spaced from the first cut groove (203a, 203b); the first cut groove (203a, 203b) and the second cut groove (204a, 204b) both penetrate through the side film section (S1) along a thickness direction of the side film section (S1), and penetrate through an outer edge of the side film section (S1); a bottom surface of the first cut groove (203a, 203b) and a bottom surface of the second cut groove (204a, 204b) are both spaced from inner edges of the side film sections (S1); the first cut grooves (203a, 203b) of the two side film sections (S1) are located at opposite sides of the bottom film section (S2); the second cut grooves (204a, 204b) of the two side film sections (S1) are located at opposite sides of the bottom film section (S2), and are located at one side of the first cut groove (203a, 203b) away from the first face film section (S31); a depth extending from an opening of the first cut groove to the bottom surface of the first cut groove is Z; a depth Z extending from an opening of the second cut groove (204a, 204b) to the bottom surface of the second cut groove (204a, 204b) is Z; in each side film section (S1), a distance between the outer edge of the side film section (S1) and the inner edge of the side film section (S1) is L; and a width of the bottom film section (S2) is D2, where (2L−D2)<Z<L;
wherein each side film section (S1) comprises a first oblique crease (240, 270a) and a second oblique crease (250, 270b); the first oblique crease (240, 270a) is located at one side of the first cut groove (203a, 203b) away from the second cut groove (204a, 204b); the first oblique crease (240, 270a) comprises a first fixed end (P1) and a first free end (Q1); the first fixed end (P1) is an intersection of the side film section (S1), the first face film section (S31) and the bottom film section (S2); the first free end (Q1) intersects with a side surface of the first cut groove (203*a*, 203*b*); a distance between the first free end (Q1) and the bottom surface of the first cut groove (203*a*, 203*b*) is greater than 0; wherein the second oblique crease (250, 270*b*) is located at one side of the second cut groove (204*a*, 204*b*) away from the first cut groove (203*a*, 203*b*); the second oblique crease (250, 270*b*) comprises a second fixed end (P2) and a second free end (Q2); the second fixed end (P2) is an intersection of the side film section (S1), the second face film section (S32) and the bottom film section (S2); the second free end (Q2) intersects with a side surface of the second cut groove (204*a*, 204*b*); a distance between the second free end (Q2) and the bottom surface of the second cut groove (204*a*, 204*b*) is greater than 0.

* * * * *